UNITED STATES PATENT OFFICE.

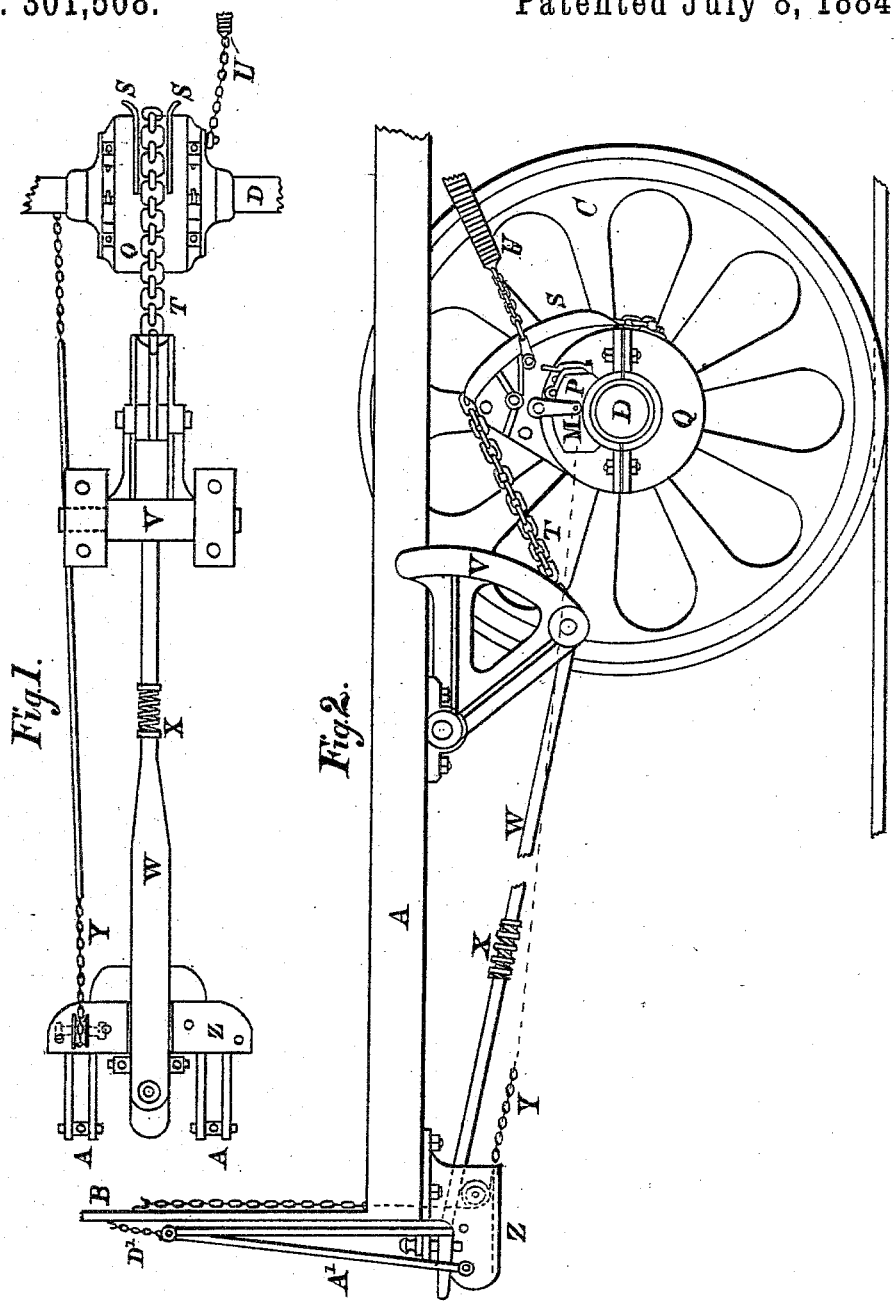

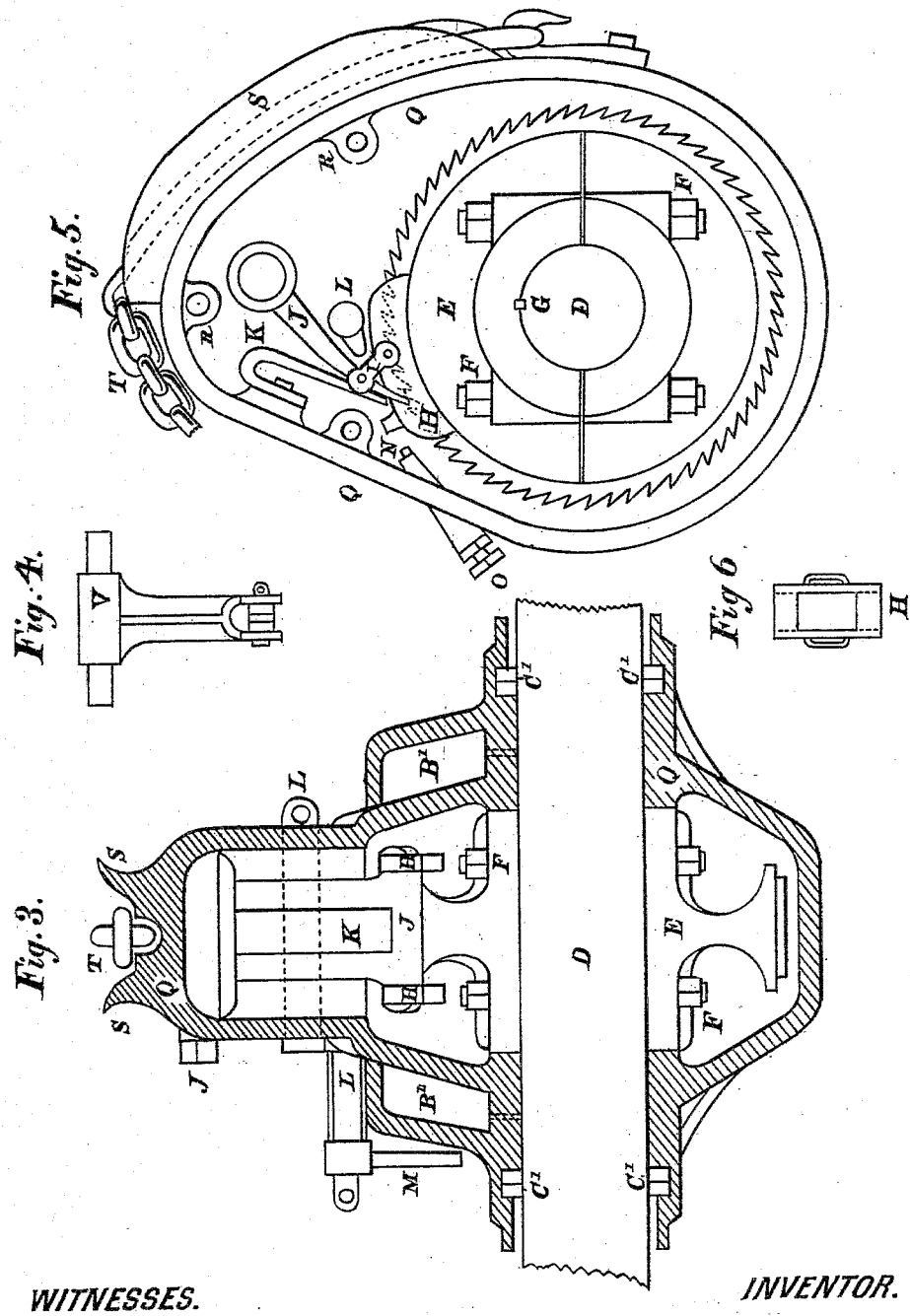

JOHN G. McCORMICK, OF LOUISVILLE, KENTUCKY.

CAR-STARTER.

SPECIFICATION forming part of Letters Patent No. 301,508, dated July 8, 1884.

Application filed May 5, 1884. (No model.)

*To all whom it may concern:*

Be it known that I, JOHN G. MCCORMICK, a citizen of the United States, residing at Louisville, in the county of Jefferson and State of Kentucky, have invented a certain new and useful Improvement in Street-Car Starters; and I do hereby declare that the following is a full, clear, and exact description of the construction and operation of the same, reference being had to the accompanying drawings, forming part of this specification.

This invention relates to improvements in street-car starters in which a ratchet-wheel secured firmly upon the car-axle is used in connection with a metal case, by which it is inclosed, and in the upper part of which a pawl is hinged, which engages with the teeth of the wheel when the device is drawn forward by the action of the draw-bar, and thereby turns the wheels and starts the car, after which the pawl becomes disengaged by the forward motion of the car, and the device is again replaced by means of a spiral spring in the rear connecting with the frame of the car.

The object of this invention or improvement is to provide a combination of devices so arranged as to answer as a substitute for a crank to assist in starting the car, and thereby relieve the horses of the great strain upon them in starting the car, after which the device becomes disengaged by the motion of the cars, and is again replaced by means of the spiral spring in the rear ready for another start. I attain the above object by the mechanism illustrated in the drawings, in which—

Figure 1 is a top or plan view of the draw-bar, showing the construction and general arrangement of the several parts. Fig. 2 is a side elevation of the machine, showing the car-wheel and devices inclosed by the casing with the chain, the quadrant-sheave, and the draw-bar. Fig. 3 is a sectional view of the machine, showing the arrangement of the several parts constituting the device. Fig. 4 is a view of the quadrant-sheave, showing the flanges and the chain connection. Fig. 5 is a side elevation of the machine with the casing removed, showing the ratchet-wheel, catch-pawl, and its spring, and also the small links and flanges to which they are hinged, and the small arm for raising the pawl in backing. Fig. 6 is a top view of the flanged plate for guiding the pawl, to which the small links are hinged.

Similar letters refer to similar parts throughout the several views.

In the drawings, A represents part of the frame of the car. B is the dash-board. C is the wheel, and D is the axle, all of which may be made in any of the known forms.

E is the ratchet-wheel, which is made of metal and formed as shown in the drawings, but is made in two pieces, and secured firmly upon the axle by means of the bolts F F, and kept from turning by means of the key G, as shown.

H is a small flanged plate, secured to the inside of the casing, having an opening in the center for the end of the pawl, which answers as a guide therefor with a continuation of the flanges on the under side, which works in a rabbet in the edges of the ratchet-wheel to keep it in its place.

I I are small links hinged to the plate H, and also to the pawl J, for the purpose of holding the pawl clear of the ratchet-teeth in replacing the device, or when necessary to back the car. This pawl J is made in form as shown, and hinged in the casing.

K is a spring resting upon it to insure uniformity of action.

L is a small spindle and arm for raising the pawl J when necessary to back the car, and M is the arm by which it is operated.

N is a lug on the flange H, which answers as a stop for the device when turned forward in starting, and O is a set-screw for adjusting the distance. Q Q is the casing, which is made in two pieces, as shown in the drawings.

R R are the lugs for holding the casing-cover, and S S are flanges on the side for guiding the chain T, by which it is operated.

U is a spiral spring in the rear of the device for replacing it.

V is a quadrant-section of a sheave hinged to the frame of the car for pressing down the chain T, in order to reduce its length to prevent the draw-bar from being drawn out faster than the car advances as the device turns forward, (the chain being fast thereto.)

W is the draw-bar, which is made in form as shown.

X is a stop-collar and spiral spring on the draw-bar W, to regulate the distance to be drawn out, and to prevent the sudden shock when coming in contact with the stop-block.

Y is a chain connecting with the arm M for detaching the pawl P in backing the car.

Z is the bearing-block of the draw-bar W. This draw-bar W is made in form as shown, but may be made in any suitable form.

A' is a hanger or swinging frame for supporting the end of the draw-bar W, which hanger is made in form as shown in the drawings, and hinged to the front of the car.

B' are oil-chambers in the casing.

C' are leather and metal packing-rings between the casing and car-axle D, to prevent the oil from leaking out.

D' is a chain for holding the upper end of the hanger-frame A'.

Having thus fully described my invention, in order that others skilled in the art may understand its operation, it is only necessary after the car has ceased to move, and the draw-bar and crank device is automatically drawn back, to apply the power of the horses, by means of which the device will turn forward, and thereby cause the pawl J to engage with the teeth of the ratchet-wheel E, and convert it into a substitute for a crank, which, when drawn forward by the draw-bar, greatly assists in turning the wheels, and thereby starts the car much more easily than if no such device had been used, and as soon as the car is in motion it disengages the pawl J, and by means of the spring U in the rear the device is automatically replaced again, while the car proceeds on its way by the ordinary draft of the horses until another stop takes place, when the same operation is to be repeated, and so on in like manner at each stoppage of the car; but it sometimes becomes necessary to back the car, and in order to do so it is necessary for the driver to raise or detach the pawl J from the teeth of the ratchet-wheel E by means of the chain Y, when the car can be moved in that direction. Therefore,

What I claim as my invention, and desire to secure by Letters Patent in street-car starters, is—

1. The metal ratchet-wheel E and casing Q, as above described, having oil-chambers B' B', oil-cap P, leather and metal packing-rings C' C', adjusting-screw O, flanges S S, and spiral spring U, substantially as described, and for the purpose set forth.

2. In a car-starter having ratchet-wheel E and casing Q, the combination of the plate H, stop-lug N, links I I, pawl J, spring K, and arm L, with its operating-lever M, substantially as described, and for the purpose set forth.

3. The quadrant-sheave V, combined with the chain T and draw-bar W, having stop-collar and spring X, as above described, in combination with the bearing-block Z and hanger-frame A', and its chain D', substantially as described, and for the purpose set forth.

JOHN G. McCORMICK.

Witnesses:
 FRANK PARDON,
 GEORG HAMMER.